Aug. 12, 1924.
L. G. RILEY
SUBMARINE MOTOR CONTROL SYSTEM AND APPARATUS
Filed Nov. 23, 1920    9 Sheets-Sheet 1
1,504,577
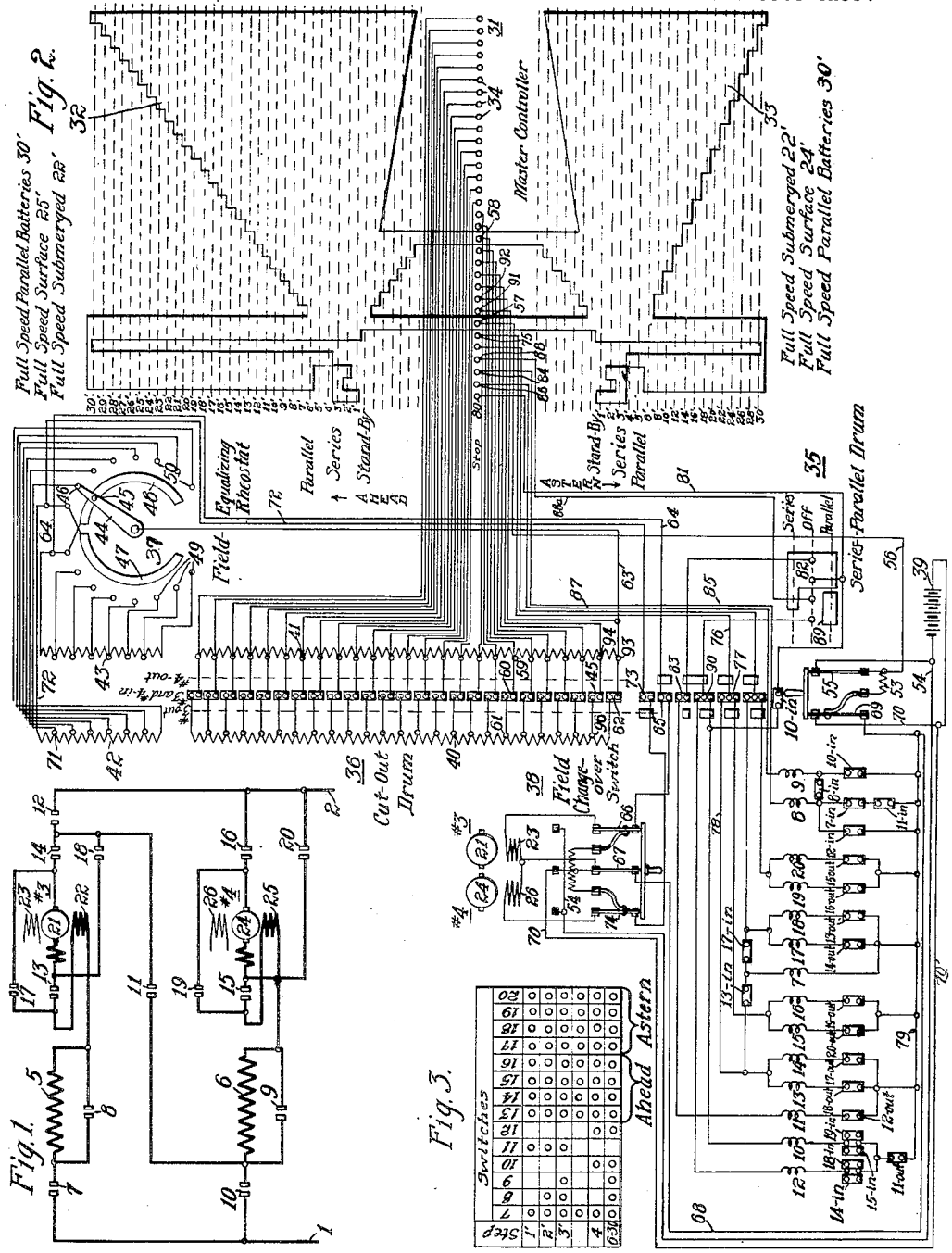
WITNESSES:
H. J. Shelhamer
W. R. Coley
INVENTOR
Lynn G. Riley
BY
Wesley G. Carr
ATTORNEY

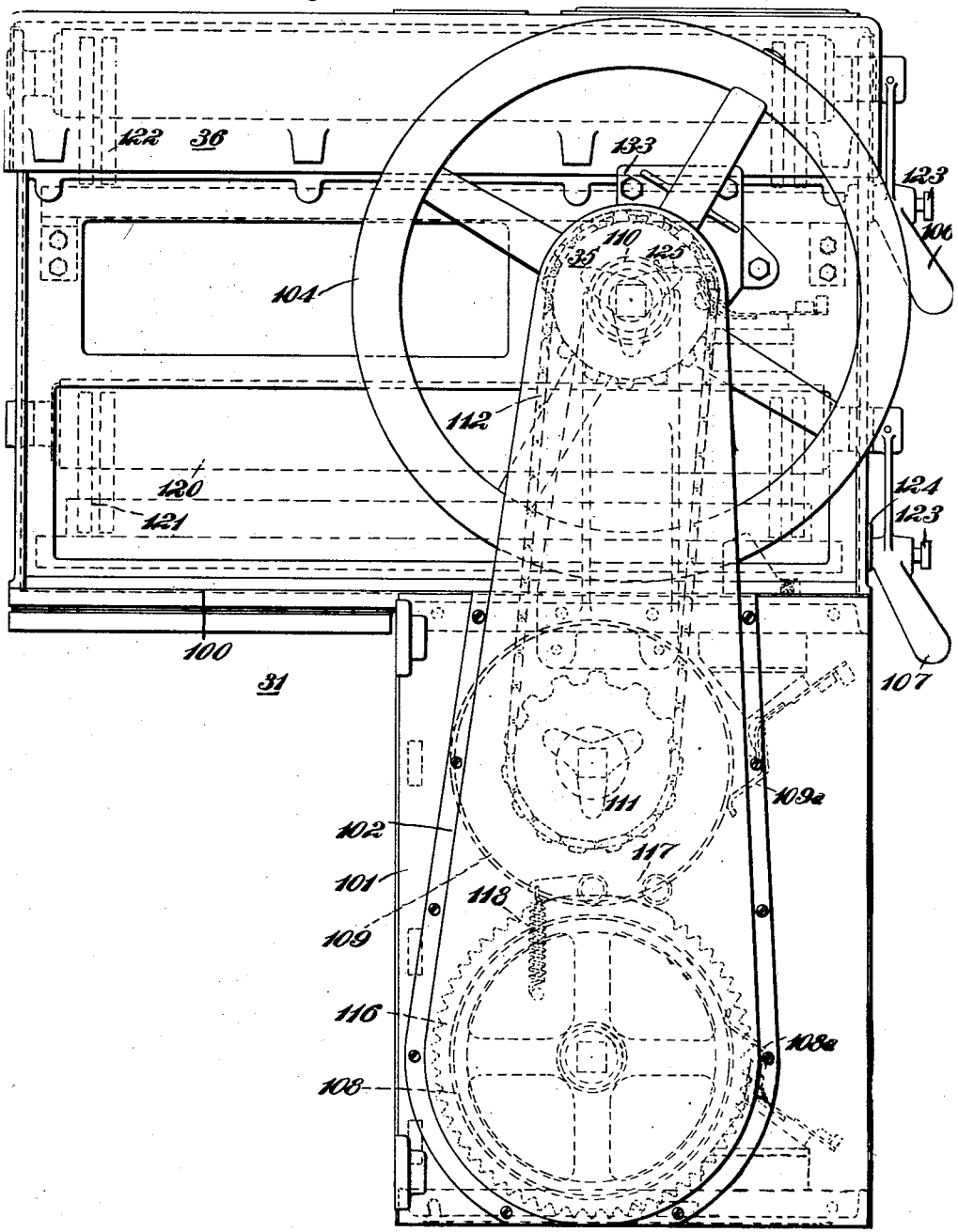

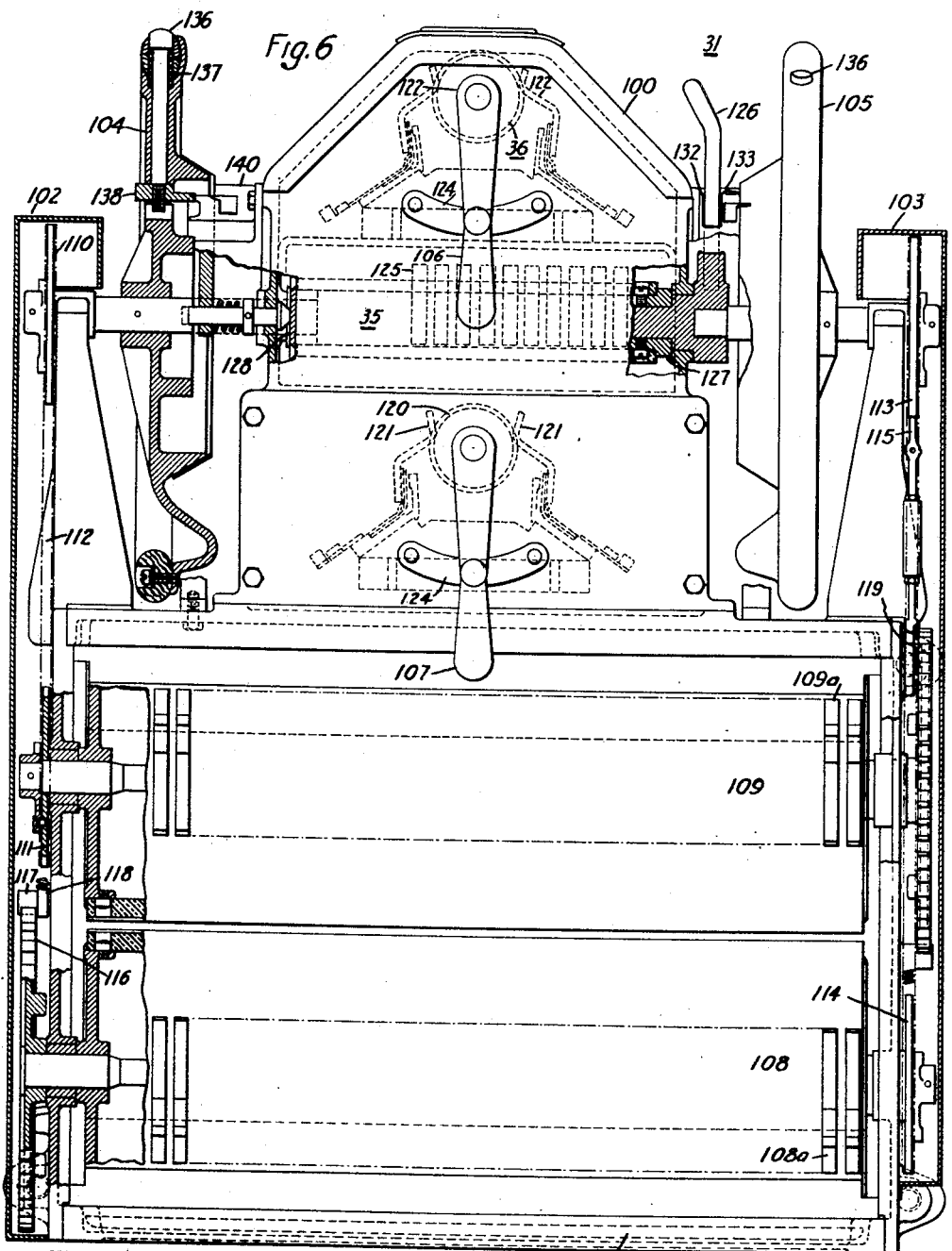

Aug. 12, 1924.
L. G. RILEY
1,504,577
SUBMARINE MOTOR CONTROL SYSTEM AND APPARATUS
Filed Nov. 23, 1920    9 Sheets-Sheet 4
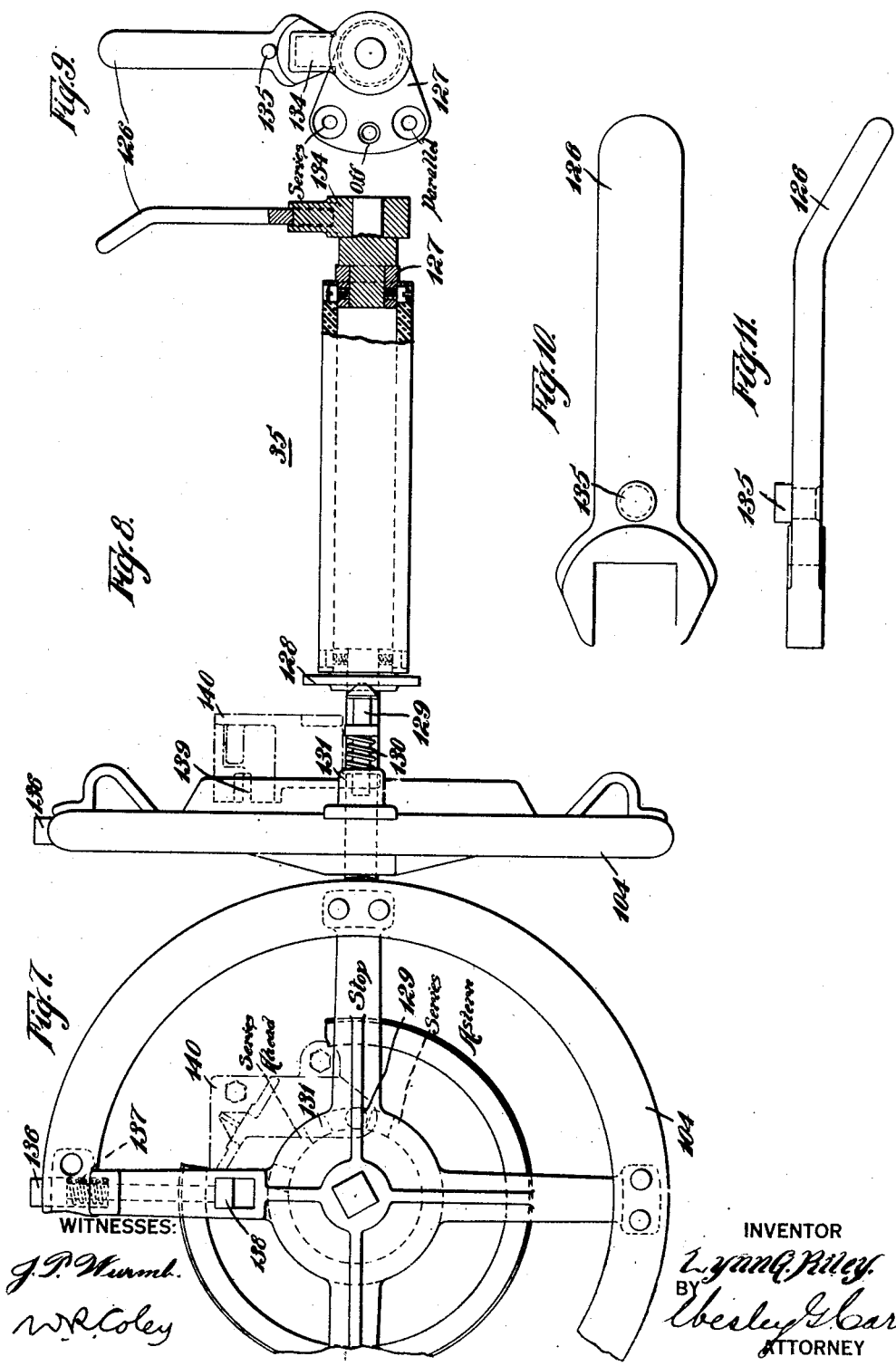

Aug. 12, 1924.
L. G. RILEY
1,504,577
SUBMARINE MOTOR CONTROL SYSTEM AND APPARATUS
Filed Nov. 23, 1920
9 Sheets-Sheet 5
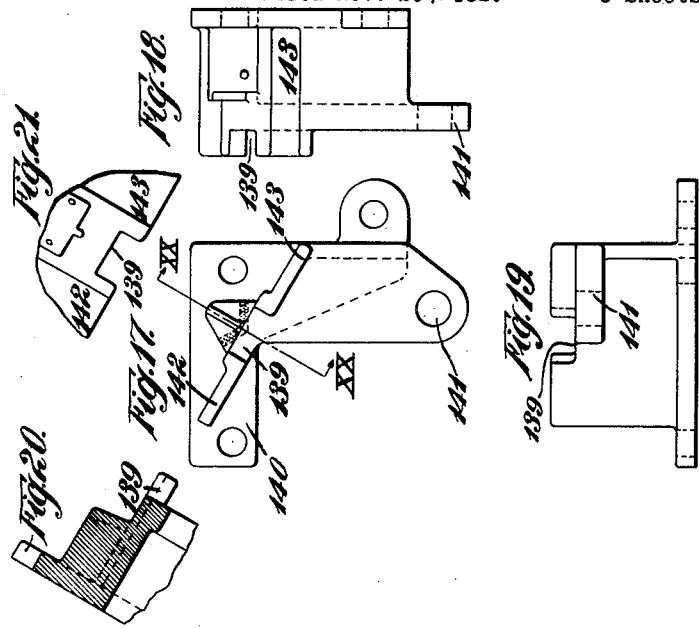
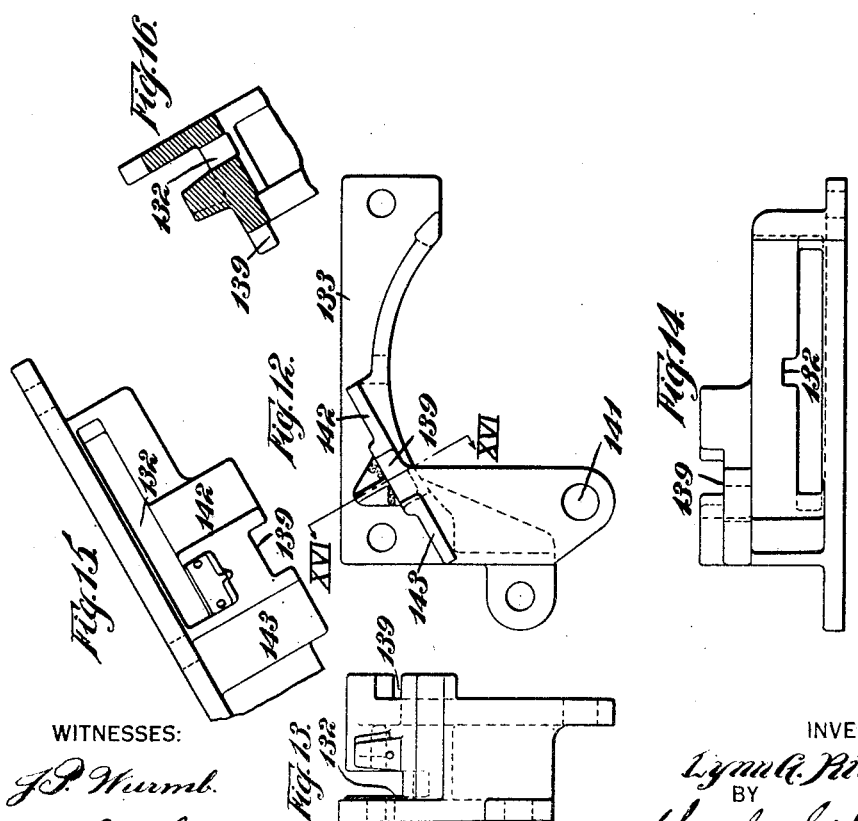
WITNESSES:
INVENTOR
Lynn G. Riley.
BY
Wesley G. Carr
ATTORNEY

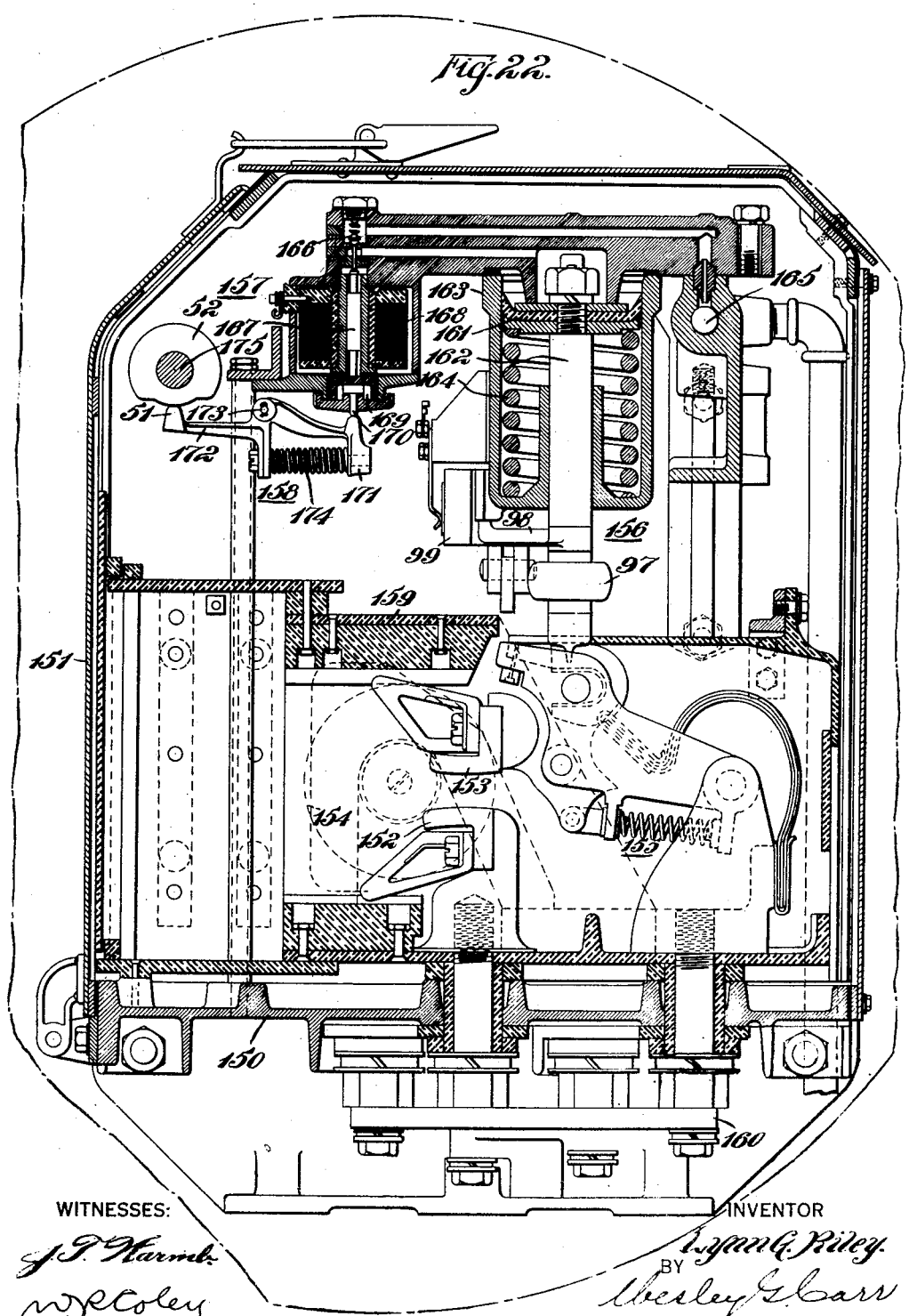

Aug. 12, 1924.
L. G. RILEY
1,504,577
SUBMARINE MOTOR CONTROL SYSTEM AND APPARATUS
Filed Nov. 23, 1920   9 Sheets-Sheet 7
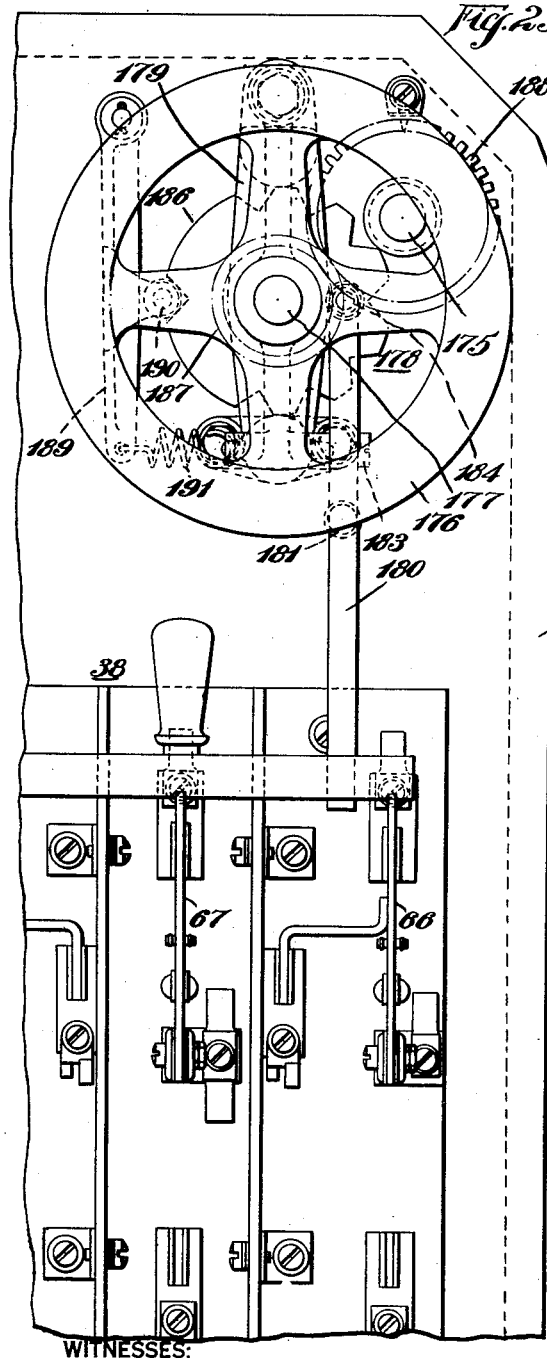
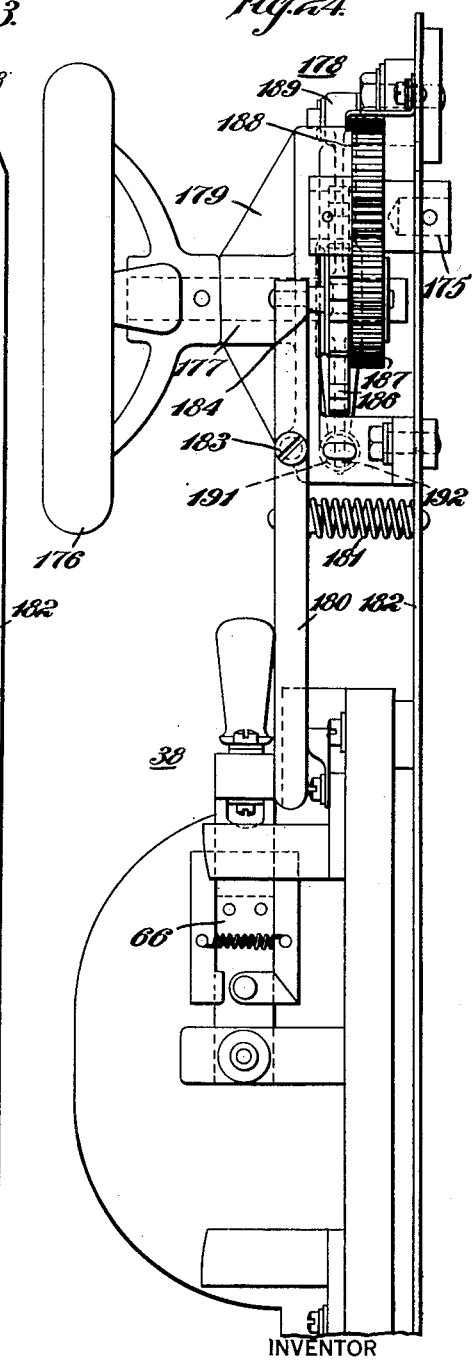
WITNESSES:
J. P. Wurmb
W. P. Coley
INVENTOR
Lynn G. Riley
BY
Wesley G. Carr
ATTORNEY

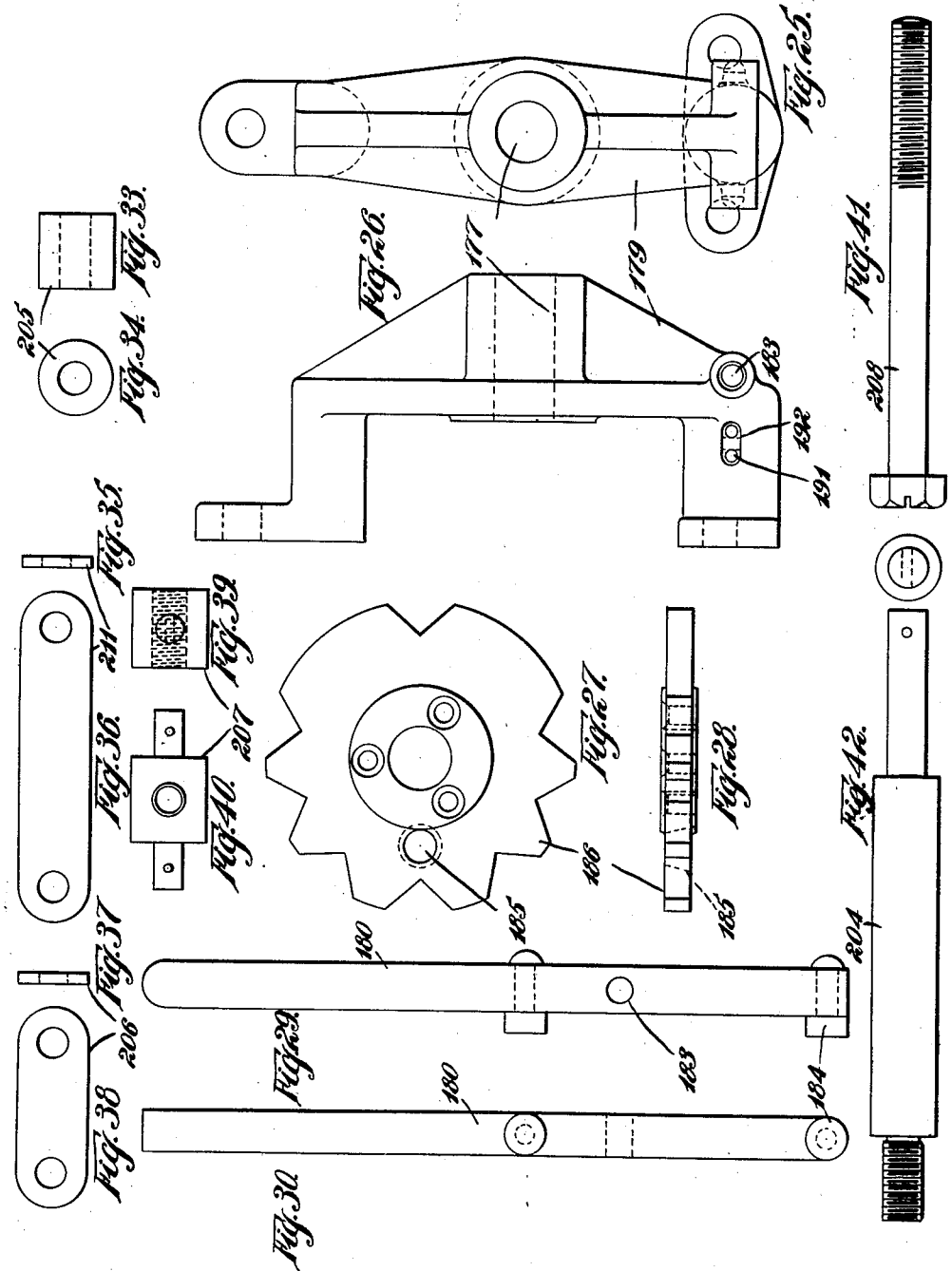

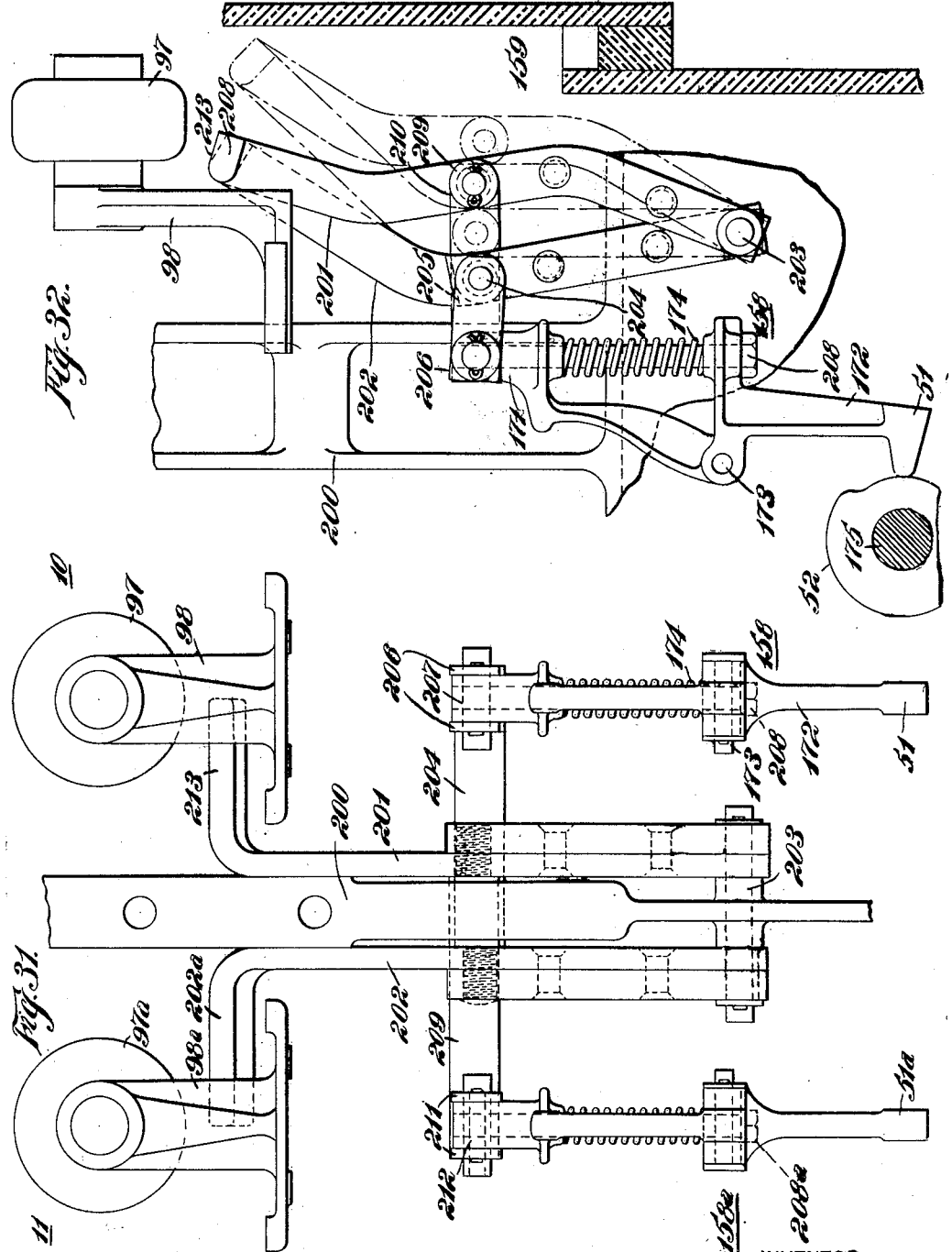

Patented Aug. 12, 1924.

1,504,577

UNITED STATES PATENT OFFICE.

LYNN G. RILEY, OF WILKINSBURG, PENNSYLVANIA, ASSIGNOR TO WESTINGHOUSE ELECTRIC & MANUFACTURING COMPANY, A CORPORATION OF PENNSYLVANIA.

SUBMARINE MOTOR-CONTROL SYSTEM AND APPARATUS.

Application filed November 23, 1920. Serial No. 426,076.

*To all whom it may concern:*

Be it known that I, LYNN G. RILEY, a citizen of the United States, and a resident of Wilkinsburg, in the county of Allegheny and State of Pennsylvania, have invented a new and useful Improvement in Submarine Motor-Control Systems and Apparatus, of which the following is a specification.

My invention relates to control apparatus and systems for dynamo-electric machines and it has special relation to the control and operation of motors for submarine vessels and the like.

Heretofore, in the operation of submarine boats it has generally been necessary to manipulate a number of different switching devices in a certain sequence, and, in many cases, these switching devices have not been grouped as conveniently as might be by reason of space limitations, so that the operator was forced to change his station or use the services of an assistant.

It is one object of my present invention, therefore, to so combine and coordinate the various pieces of control apparatus for operating the submarine propelling motors that a single master controller manipulated from a single station is sufficient to govern all of the necessary operations, such as reversing, starting, and field-regulating arrangements.

Another object of my invention is to provide means for equalizing the load upon a plurality of compound-wound motors by means of a separate rheostat setting to compensate for the unavoidable differences in manufacture of two or more motors and by means of a parallel connection of several sections of other field rheostats.

A further object of my invention is to provide relatively simple and reliable means for selectively effecting electro-pneumatic or manual manipulation of a plurality of governing switches for the submarine motors.

Still another object of my invention is to provide means for readily and selectively effecting series or series-parallel operation of a plurality of compound-wound motors.

Further objects of my invention relate to the interlocking of various parts of the necessary control apparatus, whereby the proper sequence of operation is insured and safety and convenience of operation are attained at all times.

Other more specific objects of my invention will become evident from the following detailed description taken in conjunction with the accompanying drawings wherein—

Figure 1 is a diagrammatic view of the main circuits of a system of control organized in accordance with my present invention;

Fig. 2 is a diagrammatic view of the auxiliary governing circuits for manipulating the several switches to obtain the desired connections in the system that is shown in Fig. 1;

Fig. 3 is a sequence chart, of a well-known form, serving to indicate the preferred order of operation of the various illustrated switches;

Fig. 4 is a diagrammatic representation of a complete unit switch, together with a plurality of electrical interlocks or auxiliary-circuit members of a familiar type;

Fig. 5 and Fig. 6 are views, respectively in front elevation and in side elevation, partially in section, of a master controller constructed and arranged in accordance with the principles of the present invention;

Fig. 7 to Fig. 21, inclusive, are various detailed views in both elevation and section of certain parts of the apparatus that is shown in Figs. 5 and 6;

Fig. 22 is a transverse sectional view of a switch group that is constructed in accordance with one phase of my invention;

Figs. 23 and 24 are partial views, respectively in front elevation and in side elevation, of certain interlocking apparatus that is located upon one end of the switch group that is illustrated in Fig. 22;

Figs. 25 to 30, inclusive, are detailed elevational views of certain portions of the structures that are illustrated in Figs. 23 and 24;

Figs. 31 and 32 are partial views, respectively in plan and in side elevation, of another form of interlocking apparatus that is employed in the switch group that is shown in Fig. 22; and Figs. 33 to 42, inclusive, are detailed elevational views of parts of the structure shown in Figs. 31 and 32.

Referring to Fig. 1 of the drawings, the system here shown comprises suitable supply-circuit conductors 1 and 2, which may be energized from a direct-current generator or a storage battery, in acordance with current submarine practice, for supplying energy to a plurality of compound-wound motors #3 and #4, which are adapted to be initially connected in series relation with a plurality of accelerating resistors 5 and 6. The various desired circuit connections, such as series and parallel relation of the motors and the exclusion from circuit of the accelerating resistors 5 and 6, may be accomplished by means of the illustrated switches 7 to 20, inclusive.

The several switches employed in the illustrated control system are preferably of the well-known electro-pneumatic type that has been so successful in electric railway operation, as will be evident from an inspection of Fig. 22, for example. However, for the sake of simplicity, the various switches in Fig. 1 have been illustrated in a conventional diagrammatic manner, and reference may be made to Fig. 4 for a clearer idea of the actual arrangement of the main-circuit and the auxiliary-circuit or interlock members, as well as the common actuating coil therefor. Since this type of switch and of illustration is familiar to those skilled in the art, no further general description thereof is believed to be necessary here.

The submarine is preferably equipped with a pair of port motors #3 and #4, as illustrated, and also with a pair of starboard motors, which have not been illustrated since the arrangement and control thereof is exactly the same as those of the port motors. Similarly, Fig. 2 relates to only the port motors #3 and #4, and for the control of the starboard motors the electrical connections would merely be duplicated.

However, the entire reversing, starting and field-regulating control for both the port and the starboard motors are incorporated in the single master controller that is illustrated in Figs. 5 and 6, as subsequently set forth in detail.

The motor #3 may comprise a commutator-type armature 21, which is preferably provided with the usual commutating field winding, and for excitation purposes a series field winding 22 and a shunt field winding 23 are provided. Similarly the companion port motor #4 is provided with an armature 24, a series field winding 25 and a shunt field winding 26.

Referring to the auxiliary circuits for the port motors that are shown in Fig. 2, the illustrated system comprises a master controller 31 which is provided with a single contact segment of the desired contour, and which in general may be divided into two portions 32 and 33 that respectively correspond to ahead and astern operation.

A plurality of control fingers 34 are adapted for selectively engaging the contact segments 32 and 33 as the controller is moved through its various Stand-By positions and through a plurality of operating positions corresponding to series and to parallel relation of the motors and to gradual regulation of the shunt field windings thereof. These operating positions are denoted by the reference characters 1' to 30' in the ahead section of the master controller and by corresponding characters in the astern section, although a smaller number of positions are employed in the latter section, in accordance with usual submarine practice.

A series-parallel drum 35, having three positions, respectively designated as Series, Off and Parallel, is provided for governing the operating arrangement of the port motors #3 and #4.

A cut-out drum 36, a field equalizing rheostat 37, a field change-over switch 38 and a suitable storage battery 39, for supplying energization to the various auxiliary circuits, are also provided.

The cut-out drum 36 is shown as occupying its normal or central position designated as "#3 and #4 In," corresponding to the operative condition of both of the port motors.

On either side of the above-mentioned central position are other positions respectively marked "#3 Out" and "#4 Out," reference being made to the cutting out of the one or the other of the port motors by reason of the disablement thereof for any reason. The illustrated lower section of the cut-out drum serves to properly govern the motor-controlling switches 7 to 20, inclusive, while the major portion of the drum is electrically associated with a plurality of field-circuit resistors 40 and 41. These resistors are subdivided into a large number of sections, and a series of contact segments serve to connect the corresponding pairs of sections in parallel relation when the cut-out drum occupies its illustrated intermediate position. The importance of this combination of resistors and contact segments will be subsequently pointed out in conjunction with the operation of the field-equalizing rheostat 37.

Whereas the field-circuit resistors 40 and 41 are normally connected in parallel relation in the circuit of the two shunt field windings 23 and 26, a pair of smaller resistors 42 and 43 are respectively adapted to be connected in the desired proportions to the shunt field windings 26 and 23, by means of a simple manipulation of the field-equalizing rheostat 37.

This rheostat comprises a single operating arm or movable contact member 44, which is provided with a plurality of contact buttons or tips 45 and 46. A pair of complementary arcuate segments 47 and 48 are adapted to be selectively engaged by the contact button or tip 45, in accordance with the occupation of a position to the left or to the right of the vertical, as viewed in Fig. 2, by the arm 44.

Concentrically located with respect to the arcuate segment 47 is a series of contact terminals 49, which are connected to various tap-points of the field-circuit resistor 43. Similarly a plurality of contact terminals 50 are concentrically arranged with respect to the other arcuate segment 48 and are respectively connected to suitable tap-points on the other field-circuit resistor 42. The various contact terminals 49 and 50 are adapted to be selectively engaged by the outer contact button or tip 46 of the operating arm 44.

In order to render the operation and peculiar features of my master controller clearer, the entire operation of the illustrated port motors #3 and #4 will be described as briefly as is consistent with clarity.

Assuming, therefore, that it is desired to operate the port motors in the ahead direction, the master controller 31 may be considered as initially occupying its illustrated central or Stop position. Under these circumstances, one auxiliary circuit is established from the positive terminal of the battery 39 through conductor 54, shunt-field switch blade 55, conductor 56, control finger 57, which engages the contact segments 32 and 33 of the master controller in all positions, whence a single circuit is continued through control finger 58 to tap-point 59 of the field-circuit resistor 41. One circuit is continued from that point through the lower portion of the resistor 41, while a branch circuit is established through contact segment 60 of the cut-out drum, tap-point 61 of the other resistor 40, the lower section of that resistor, and a contact segment 62 of the cut-out drum to the lower terminal of the resistor 41.

After including these two sections of resistors in parallel relation, a circuit is completed through conductor 63 and operating arm 44 of the field-equalizing rheostat 37, where the circuit divides, one branch including arcuate segment 48, conductor 64, contact segment 65 of the cut-out drum, blade 66 of the field change-over switch, shunt field winding 23 of the motor #3, field change-over switch blade 67, conductor 68, shunt field switch blade 69, and conductor 70, to the negative terminal of the battery 39.

It will be noted that a suitable field-discharge resistor 53 is suitably connected across the switch blades 55 and 69 for the familiar purpose of absorbing the inductive kick of the shunt field winding, when the circuit thereof is opened.

The other branch circuit is continued from the operating arm 44 of the field-equalizing rheostat 37 to the intermediate tap-point 71 of the resistor 42, and thence through the uppermost section thereof to conductor 72, the circuit being completed through contact segment 73 of the cut-out drum, field change-over switch blade 74, shunt field winding 26 of the port motor #4 and thence through the field change-over switch to the battery 39 as already traced.

It will be noted that under the illustrated conditions of the field-equalizing rheostat 37, one section of the resistor 42 is connected in circuit with the shunt field winding 26 of the port motor #4, whereas no section of the corresponding resistor 43 is connected in circuit with the other shunt field winding 23 for the other port motor #3. By swinging the operating arm 44 in a clockwise direction more and more of the resistor 42 may be included in circuit with the shunt field winding 26 without effecting the circuit conditions of the other shunt field winding 23. On the other hand, by operating the switch arm 44 into contact with the several contact terminals 49, any desired amount of the resistor 43 may be connected in circuit with the shunt field winding 23 for the port motor #3, without affecting the circuit conditions of the other shunt field winding 26.

In this way, the unavoidable manufacturing and installation differences in the propelling motors and their operating circuits may be compensated for by the initial setting of the field-equalizing rheostat 37, so that the load carried by the respective port motors #3 and #4 may be equally divided at all times.

An important advantage of the parallel arrangement of the resistors 40 and 41 resides in the fact that in the event of breakage or other open circuit of one section of either resistor, not only does the shunt field-winding circuit remain unbroken, but the same change in excitation is made in both field windings 23 and 26, since the resistors in question are in common circuit relation with the field windings.

It should further be noted that in case of the disablement of either #3 or #4 motor, the cut-out drum 36 not only re-arranges the switch-governing circuits in the proper manner, but also excludes the resistor 40 from circuit in either position "#3-Out or #4-Out". The corresponding shunt field winding 23 or 26 is also excluded from circuit.

Consequently, the resistor 41 is connected in circuit with whichever shunt field winding is active, while the adjustment of the field-equalizing rheostat 37 is unchanged. The result is that the range of energization of the shunt field winding that is employed, and, therefore, the effects thereof upon the corresponding motor, are the same as those that obtained during the previously-described normal operation.

Upon actuating the master controller 31 through the illustrated initial positions, the set of control fingers 57 to 58 are successively engaged by the contact segment 32 until the Stand-By position of the controller is reached. In this way, the lower sections of the resistors 40 and 41, that is, the portions below the tap-points 61 and 59, respectively, are gradually cut out of circuit. At the same time the set of control fingers to the right of the control finger 58 are also gradually engaged by the contact segment 32, whereby the upper or remaining portions of the resistors 40 and 41 are also gradually excluded from circuit.

Consequently, in the illustrated Stand-By position, the resistors 40 and 41 are entirely cut out and the strongest possible shunt-field excitation, as is desirable, will be provided when starting the motors.

Upon actuating the master controller from the Stand-By position to initial operating position 1', the contact segment 32 engages control finger 75, whence circuit is continued through conductor 76, and contact segment 77 of the cut-out drum, where the circuit divides, one branch including conductor 78, the parallel-related actuating coils of the switches 13 and 14 and interlocks 18-out and 17-out to the negatively connected conductor 79. The other branch circuit includes the parallel-related actuated coils of the switches 15 and 16 and the corresponding interlocks 20-out and 19-out.

In this way the forward or ahead directional switches 13, 14, 15 and 16 are closed, as indicated in the initial line, designated as 1', of the sequence chart, Fig. 3.

A further circuit is continued from the conductor 78, as soon as the switch 13 is closed, through interlocks 13-in and the actuating coil of the line switch 7, to the negative conductor 79.

Simultaneously with the above operations another circuit is established from the contact segment 32 of the master controller through control finger 80, conductor 81, contact segment 82 of the series-parallel drum 35 in its series position, for example, whence circuit is established through contact segment 83 of the cut-out drum 36, the actuating coil of the switch 11, and interlock 12-out, to the negative conductor 79.

The switches 7, 11, and 13 to 16 are now all closed, as indicated by the sequence chart, and a series connection of the port motors #3 and #4 with the accelerating resistors 5 and 6 is thus established to start the motors into operation. Inasmuch as this series arrangement of the motors is familiar to those skilled in the art, it is not believed to be necessary to trace the circuits in detail in Fig. 1.

In position 2' of the master controller, the contact segment 32 engages control finger 84, whence circuit is continued through conductor 85, actuating coil of switch 8, interlocks 7-in and 11-in (these switches being previously closed) and thence to the negative conductor 79. In this way, the resistor 5 is excluded from circuit to effect a certain degree of acceleration of the motors.

In position 3', the contact segment 32 engages control finger 86, whence circuit is continued through conductor 87, actuating coil of switch 9, interlock 8-in, and thence through the previously mentioned interlocks 7-in and 11-in to the negative conductors 79. Consequently, the other accelerating resistor 6 is excluded from circuit to effect a full series relation of the motors #3 and #4.

If parallel operation of the motors is not desired at this time, the master controller may be actuated to position 6' without further affecting the control circuit. However, if, before actuating the master controller, the series parallel drum 35 has been actuated to its position marked "Parallel", then operation of the master controller to its position 4' will effect open-circuit transition of the motors, by first opening switches 8, 9 and 11, and then closing switches 10 and 12, as indicated in the sequence chart, Fig. 3.

In position 4', therefore, the master-controller contact segment 32 engages control finger 88, whence circuit is continued through conductor 88ª, contact segment 89 of the series-parallel drum in its parallel position and contact segment 90 of the cut-out drum 36, where the circuit divides, one branch traversing actuating coil 12, interlocks 14-in and 11-out to negative conductor 79. The other branch includes the actuating coil of switch 10, interlocks 15-in and 11-out and negative conductor 79.

In position 6', the control fingers 84 and 86 are again engaged by the contact segment 3² because of the simultaneous closure of the resistor short-circuiting switches 8 and 9. The motors are now connected in full parallel relation.

To effect further speed control of the motors, the master controller may be gradually actuated through its positions 7' to 30', inclusive. This action gradually introduces the previously-mentioned parallel-related sections of the resistors 40 and 41 into the common circuit of the shunt field windings 23 and 26. Such introduction of resistance correspondingly weakens the shunt-field excitation of the port motors and thus increases their speed as desired.

The circuit connections for one pair of sections of the resistors 40 and 41 will be traced out in detail, by way of example. In position 6' of the master controller, control fingers 91 and 92 are bridged by the contact segment 32. These control fingers are respectively connected to tap-points 93 and 94 of the field-circuit resistor 41, whereby the lowermost section thereof is short-circuited. At the same time a branch circuit is established from the tap-point 94 through contact segment 45 of the cut-out drum 36, tap-point 96 of the resistor 40 and lowermost section thereof, and thence through contact segment 62 of the cut-out drum to the tap-point 93 of the resistor 41. The two lowermost sections of the resistors 40 and 41 are thus simultaneously short-circuited.

Upon movement of the master controller to position 7', such short-circuit is removed by reason of the disconnection of the control finger 91 from the contact segment 32. Consequently, the resistor sections in question are inserted in parallel relation in the common circuit of the shunt field windings 23 and 26.

In a similar manner, as the master controller 31 is notched up towards its position 30', successive pairs of sections of the resistors 40 and 41 are actively connected in circuit, by reason of the disconnection of the control finger corresponding to the lower tap-point of each section from the contact segment 32 of the master controller.

In this way, by means of the field-equalizing rheostat 37 the initial differences between the two port motors #3 and #4 are compensated for and, after the motors have been operated to their full series or full parallel relation, the field-circuit resistors 40 and 41 are gradually cut out in equal steps to suitably increase the motor speed as desired.

If the field change-over switch 38 is actuated to its upper position, a circuit is established directly from the battery 39 through the shunt field windings 23 and 26 for the motors #3 and #4, respectively, as will be evident without detailed description. Furthermore, since the switch blade 67 no longer engages the intermediate lower jaw, which is connected to battery conductor 68, it follows that the master controller, even though operated, is not capable of transmitting energy through the actuating coils of the various switches. In other words, the previously described operation by means of the master controller 31 is no longer effective, but other manual means to be later described is employed for closing the various switches in the desired order.

Consequently, as will be subsequently described in detail, upon damage to the electrical system, manual control without employing electrical control circuits in any way may be utilized to fully govern the movements of the submarine motors, the field change-over switch meanwhile occupying its upper position.

Referring to Figs. 5 to 21, inclusive, the master controller 31 here shown comprises a relatively large upper compartment 100 for housing the cut-out and series parallel drums, and a lower compartment 101 of smaller size for housing the main or speed drums for both the port and the starboard motors. It will be understood without detailed description, that a suitably rigid cast frame is provided, being covered with appropriate plates or removable covers, so that no live electrical parts are visible, or can be reached by the operator under normal conditions.

In addition to the main cover plates, a plurality of suitable chain guards 102 and 103 are provided at opposite sides of the master controller for a purpose to be set forth. Each chain guard extends from the bottom face of the controller to the hub of the corresponding port or starboard handwheel 104 or 105.

In addition, a pair of operating levers 106 and 107 for the respective cut-out drums are located upon one end face of the master controller.

The main or speed drums 108 and 109 are located one above the other in the lower compartment 101, together with the necessary control fingers and finger-bases 108ª and 109ª, respectively. The lower drum 108 may be employed for the starboard-motor circuits and the upper drum 109 for the port-motor circuits.

To drive the port drum 109 from the corresponding handwheel 104, a pair of sprocket wheels 110 and 111 are suitably secured to the ends of the operating shafts for the drum 109 and the handwheel 104, respectively, within the chain-guard 102, these sprocket wheels being suitably connected by means of a chain 112. Similar sprocket wheels 113 and 114 are associated with the other handwheel 105 and the other speed drum 108, and chain 115 serves to connect these sprocket wheels, as shown in Fig. 6.

Each speed-drum shaft carries at the end opposite the sprocket-wheel a star-wheel, such as 116 for the star-board speed drum 108. With the star-wheel is associated suitable pawl and roller 117, which is biased to engage the star-wheel by means of a suitable spring 118.

The various notches in the star-wheel correspond to the operating positions of the speed drum and thus the pawl and star-wheel tend to accentuate the controller positions and enable the operator to readily locate them by the sense of touch, in accordance with operating principles that are familiar in connection with drum controllers for electric railway vehicles, and the like.

The star-wheel 119 for the port speed drum 109 is shown in Fig. 6.

The two sets of speed drums and hand-wheels are entirely independent of each other in their movements with the exception of the interlocking with the series-parallel drum 35, as will be hereafter described in detail.

The upper compartment 100 of the controller contains, in its central lower portion, a cut-out drum 120, together with suitable control fingers and finger bases 121, for governing the starboard motors, while the port cut-out drum 36, together with its set of control fingers 122, is located in the upper portion of the compartment 100. The axis of the two cut-out drums 36 and 120 are located in vertical alinement and at substantially right angles to the axis of the speed drums 108 and 109 and of the series parallel drum 35.

The operating handles 106 and 107 are suitably secured to the operating shafts of the cut-out drums and are further provided with suitable spring-pressed pins 123, best shown in Fig. 5, for engaging suitably located recesses or notches in the bosses 124 on the front cover of the compartment 100. The various notches correspond to the positions that were described in connection with the cut-out drum 36 in Fig. 2, namely, proceeding from left to right as viewed in Fig. 6, "#3 motor out," "#3 and #4 motor in," and "#4 motor out."

The series-parallel drum 35 is located between the port cut-out drum 36 and the starboard drum 120 and extends at right angles to them, as previously mentioned. The series-parallel drum is suitably supported in the controller frame, to be rotatively manipulated by means of a handle or operating key 126, which is clearly shown in various positions in Figs. 8 to 11, inclusive. A plurality of positioning plates or segments 127 and 128 are located at opposite ends of the series-parallel drum 35 and are respectively provided with outer relatively deep notches marked "Series" and "Parallel" and with a central relatively shallow notch marked "Off." These notches correspond to the positions of the series-parallel drum 35 that is shown in Fig. 2.

The only mechanical connections between the series-parallel drum 35 and the hand-wheels 104 and 105 relate to the matter of interlocking, including the use of the segments 127 and 128, as about to be explained.

A longitudinally movable pin 129 extends through the controller frame in the vicinity of the hub of each hand-wheel, as best shown in Figs. 7 and 8, and is provided with a rounded head for engaging the respective notches in the plate or segment 127 or 128 of the series-parallel drum 35. A helical spring 130 surrounds the pin 129 and serves to bias it to engage the corresponding segment, such as 128 as illustrated in Fig. 8. The other end of the pin 129 is adapted to engage suitable notches in a boss 131 on the hand-wheel hub; these notches respectively corresponding to "Stop," "Series Ahead" and "Series Astern" positions of the master controller, as indicated in Fig. 7. These positions are also set forth in the control system that is shown in Fig. 2.

The hand-wheel 104 for example, (see Fig. 7 and Fig. 8), is thus interlocked with the series-parallel drum 35 as follows:

(a) If the series-parallel drum 35 occupies either the series or the parallel position, corresponding to the outer notches on the segment 128, the drum can not be moved unless the hand-wheel occupies either the Stop or the Series position ahead or astern, since in any other position the pin 129 can not be forced away from the segment 128 by operation of the handle or operating key 126.

(b) If the series-parallel drum occupies its central "Off" position the hand-wheel can not be moved from the Stop or either of the Series positions, by reason of the insertion of the left-hand end of the pin 129 in the corresponding slot in the hand-wheel boss 131, when the other end of the pin 129 occupies the shallow central notch in the segment 128, corresponding to the "Off" position of the series-parallel drum 35.

The operating key 126 for the series-parallel drum can not be inserted in position, or removed therefrom, unless the series-parallel drum occupies its "Off" position. In this event, the key may be inserted or removed through a slot 132 in a casting or interlocking device 133 that is bolted to the controller drum, as indicated in the assembled view, Fig. 6. The details of the casting 133 will be evident from an inspection of Figs. 12 to 16, inclusive. When the key is inserted through the opening 132 it engages a lateral projection of a collar 134 that is secured to one end of the series parallel drum 35. A boss or protuberance 135 near the lower end of the series-parallel operating key 126 passes through a corresponding portion of the slot 132, as clearly indicated in Fig. 14, when the series-parallel drum occupies its "Off" position. Otherwise, the boss 135 will strike a portion of the casting 133 and removal or insertion of the operating key is prevented.

The casting 133 is also interlocked with the hand-wheel 105 in a manner to be described. A similar mechanical interlocking occurs in connection with the hand-wheel 104 and a casting 140 which is located on the opposite side of the controller and which is shown in detail in Figs. 17 to 21, inclusive.

The hand-wheel 104 is normally locked in position by means of a pin 136, the upper end of which protrudes beyond the periphery of the hand-wheel, to which position it is biased by a suitable coil spring 137 that is located within the rim of the hand-wheel. The spring thus maintains a key or tongue 138 in its uppermost position within a slot on one arm of the hand-wheel, and also within a notch 139 in the casting 140. Unless the pin 136 is depressed by the operator no movement of the hand-wheel is possible. However, upon such depression of the pin, the tongue 138 passes outside of the notch 139 and movement thereof in the one or the other direction, past a ledge or flange 142 or 143, is permitted.

After the tongue passes the one or the other ledge, the pin 136 may be released, since no further interference with the operation of the hand-wheel will occur, and the return movement to the locked position may be made without requiring any attention or special manipulation on the part of the operator, since the tongue 138 will automatically slide under the ledge 142 or the ledge 143 into the central notch 139.

The pin 129 that is illustrated in Fig. 8 passes through the lowermost opening 141 in the casting 140, as illustrated in Fig. 17, while the remaining holes in the casting are employed for bolting it to the controller frame proper.

A similar arrangement of parts is embodied in the corresponding casting 133, which is employed in connection with the interlocking between the hand-wheel 105 and the series-parallel drum, including a pin similar to the pin 129 shown in Fig. 8. This pin further effects locking of the hand-wheel in the notch 139 between the ledges 142 and 143 and, in addition, is employed for the interlocking with the operating key 126 for the series-parallel drum, as previously set forth.

As already stated, the hand-wheels and the series-parallel drum are interlocked in such manner that whenever the series-parallel drum occupies an operative position corresponding to either series or parallel connections of the motors it can not be moved unless the hand-wheels are at "Stop" position or at one of the "Series" operating positions. In other words, if the master controller occupies its "Stop" or "Off" position, the series-parallel drum may be actuated to either its "Series" or its "Parallel" position, thus permitting the desired partial or full-speed control of the motors.

Furthermore, if the series-parallel drum has been first actuated to its "Series" position, after which the master controller has been moved to its Series position, and then it is decided that full parallel running speed of the motors is required, it is not necessary to return the master controller to the "Stop" or "Off" position before obtaining the desired speed connections. On the other hand, the interlocking, as previously mentioned, is such that the series-parallel drum may immediately be actuated to its "Parallel" position, whereupon the master controller may be moved through the remainder of its positions.

On the other hand, the interlocking between the series-parallel drum and the hand-wheels is such that whenever the former occupies its "Off" position it is impossible to actuate the master controller from its "Stop" or either of its "Series" positions. Consequently, it is impossible to neglect to move the series parallel drum out of its "Off" position and then move the master controller. Furthermore, if the series-parallel drum has been moved to "Off" position and the master controller has been left in one of its "Series" positions, when the operator discovers that the master controller can not be moved, he will naturally actuate the series-parallel drum to some operative position, whereupon the master controller may be moved in the one or the other direction to increase or decrease the speed of the submarine motors.

Referring to Fig. 22, the apparatus here shown comprises the switch group for governing the two port motors, either by "remote control," by means of the previously-described master controller or directly, through the agency of a manually operated wheel, as hereinafter more fully described. The switch group in general follows the structure of the well-known switch groups for railway control and comprises a suitable base plate 150, to which the usual outside cover member 151 is hinged and within the frame and various cover members are located a set of longitudinally alined stationary contact tips or terminals 152 and a co-operating set of movable contact tips or terminals 153, each pair of contact tips being provided with the usual blow-out coil 154. Each movable contact member 153 is associated with a suitable contact-holding and operating mechanism 155, which in turn is actuated by a pneumatic piston-and-cylinder device 156. The operation of the piston-and-cylinder device is governed by an electromagnetically controlled valve 157.

For manual operation of the switch group after the master controller has been rendered inoperative, an interlocking mechanism 158 is provided to actuate the respective switches in the desired sequence, as subsequently described in detail.

Each pair of co-operating contact members is enclosed in a suitable arcbox or chute 159 and is connected to appropriate exterior terminal members 160 in accordance with the usual custom.

The piston-and-cylinder device 156 comprises a suitable piston 161, the piston rod 162 of which is connected by means of an insulating knob 97 to the contact operating mechanism 155. Furthermore, the familiar auxiliary-circuit or interlocking device comprises an arm 98 which is movable with the piston rod 162, and a contact-carrying block 99, which is suitably secured to the arm 98, is provided wherever necessary to insure the proper electrical interlocking of the various switches, as previously described in connection with Fig. 2.

The piston 161 is housed within a suitable cylinder 163 and is biased to the illustrated uppermost position by means of a coil spring 164 that is located within the cylinder. The necessary fluid pressure for actuating the piston 161 is admitted through a manifold 165 to the electromagnetically operated valve 157, as will be evident from the corresponding cross-sectioned portion of the apparatus.

The device 157 comprises a double-beat valve 166 which normally occupies its illustrated lower position to prevent access of fluid pressure from the manifold 165 to the cylinder 163. The valve 166 is connected to a stem or rod 167 which is concentrically located with respect to an actuating coil 168 that is represented diagrammatically in Fig. 2. A cup-shaped armature member 169 is located in alinement with the central core member of the magnet coil 168 and, upon being attracted into abutment with the core, the valve 166 is opened to admit fluid pressure into the cylinder 163, thereby closing the switch comprising the corresponding contact members 153 and 152.

However, if it is desired to operate the illustrated switch without the use of the magnet coil 168, this action may readily be effected by pressing a pin or primary controlling member 170 to impart the same movement to the armature 169 as the previously described energization of the magnet coil 168. This type of direct operation of electro-pneumatic switches by hand to test the operating condition thereof is familiar to those skilled in the art.

However, I provide means for manually controlling the various pins or primary controlling members 170 in the desired sequence. To accomplish this result, the interlocking device 158 comprises a lever or arm 171 which is provided with a suitably located projection for engaging the protruding end of the pin 170, while a second arm 172 is pivotally mounted along with the arm 171 upon a suitable projection of the magnet casting. To provide a yielding movement between the two arms 171 and 172, for a purpose to be hereinafter set forth, a helical spring 174 is coiled around a bolt connecting depending portions of the two arms.

The left-hand or outer end of the arm 172 may constitute a cam tip or, if desired, a roller for engaging a suitably configured cam member 52, which is rigidly mounted upon an operating shaft 175. It will be understood that a number of cams 52 corresponding to the number of switches in the group are mounted upon the shaft 175 in proper position and of suitable contours to actuate the several tips 51 and, therefore, the armature pins 170 to close the various motor-controlling switches in the same sequence as was accomplished by the previously-described use of the master controller 31.

It will be evident that when the large-diameter portion of the illustrated cam 52 strikes the cam tip 51, the two arms 172 and 171 of the interlocking device 158 will be yieldingly actuated in a counter-clockwise direction to accomplish the desired result of pressing the armature pin 170.

Referring to Figs. 23 to 30, inclusive, the structure here shown comprises a part of the apparatus that is mounted within the end cabinet. This cabinet is located on one end plate of the switch group that has just been described. It will be noted that the cam shaft 175 appears in the upper right-hand corner of Figs. 23 and 24. This cam shaft is actuated through mechanism to be set forth by means of a manual wheel 176. This wheel is mounted upon a countershaft 177 that is located entirely outside of the switch group case, that is, within the end cabinet. A suitable bracket or support 179 (see also Figs. 25 and 26) is provided for the shaft 177 and also serves other purposes, as subsequently explained.

An interlocking device 178 is provided between the manual wheel 176 and the previously described field-change-over switch 38.

The switch 38, as already set forth, is of the familiar three-pole double-throw type and is preferably provided with a quick make-and-break mechanism, as illustrated. The insulating outer cross-bar of the switch, when occupying its illustrated upper position, which corresponds to manual control, as previously described, engages a lever member 180 (see Figs. 29 and 30), which extends between the switch and a point in the rear of the manual wheel 176. The lever 180 is pivotally mounted upon one end portion of the bracket 179, as indicated at 183. (See also Fig. 26.) The upper end of the lever 180 is provided with an interlocking pin 184, which is adapted to engage a recess 185 in a star-wheel 186. (See Figs. 27 and 28.) This star-wheel is rigidly connected to the manual-wheel shaft 177. To bias the lever 180 to engagement with the star-wheel 186, a coil spring 181 is adapted to act between the under side of the lever and an adjust portion of the end plate 182, the spring being located below the pivotal point 183.

Movement of the manual wheel 176 correspondingly actuates a pinion 187, which is rigidly mounted upon the shaft 177, and which meshes with a gear-wheel 188 that is secured to the cam shaft 175.

A suitable pawl member 189 is provided with an intermediate roller 190 to engage a plurality of notches in the star-wheel 186, being biased to the desired position by means of a coil spring 191 which is hooked through an opening 192 in the bracket 179.

The operation of the interlocking apparatus located within and upon the switch group may be set forth as follows: When the field-change-over switch 38 occupies its lower position, as illustrated in Fig. 2, the lever 180 is biased by the spring 181 to lock with the star-wheel 186, whereby movement of the manual wheel 176 to actuate the cam shaft 175 is prevented.

On the other hand, when, for any reason, manual control independent of the master controller is desired, the field-change-over switch 38 is actuated to its upper position, as illustrated in Fig. 23, to press against the lower end of the lever 180 and release the locking pin 184 from the corresponding recess 185 in the star-wheel.

Consequently, the manual-wheel 176 may then be actuated to effect rotation of the cam shaft 175 and, therefore, closure of the various motor-controlling switches in the desired sequence, by means of the various cams 52 and interlocking mechanisms 158, as previously described.

During the period of manual operation, the master controller and the associated circuits are ineffective to close any of the motor-controlling switches, even though by accident the master controller was moved, for reasons already set forth.

During the previously-described operation of the motor-control system through the agency of the master controller and the various coils and circuits that are illustrated in Fig. 2, the familiar electrical interlocking scheme, as indicated in Fig. 4, was employed wherever necessary to prevent the concurrent closure of two switches, such as 11 and 10, where such concurrent closure would effect a short-circuit or other undesirable conditions. This interlocking is particularly desirable to insure that all of the parallel-connecting switches are not closed until after the series-connecting switch 11 has been opened.

However, in the event of employing the manual or cam shaft control just outlined, it will be appreciated that such electrical interlocking is ineffective to perform the desired purpose. Consequently, I have devised a form of mechanical interlocking which utilizes the interlock arms 98 as one mechanical element in the interlocking train.

Figs. 31 to 42, inclusive, show this mechanical interlocking. The switch group is of such length and weight that a substantial intermediate web or partition is necessary to provide the desired strength of construction. This partition is indicated by the reference character 200 in Figs. 31 and 32, and I employ it in connection with the mechanical interlocking under discussion.

The left-hand switch parts illustrated in Fig. 31 correspond to the series-connecting switch 11 (see Fig. 1), while the right-hand switch parts in that figure correspond to the parallel-connecting switch 10. A plurality of lever members 201 and 202 are located on opposite sides of the partition 200 and adapted to be engaged or struck by the interlocking arms 98 and 98$^a$, respectively, of the switches 10 and 11.

As will be evident from inspection of Fig. 32, the lever 201 is of an elongated S-shape while the other lever 202 is of a distorted L-shape. The reason for the difference in these shapes is to provide necessary clearance for the operating parts as will be evident from the following detailed description. Both levers 201 and 202 have their lower ends pivoted upon a suitable pin 203 that extends through the partition member 200.

Considering the L-shaped lever 202 for the time being, which is the lever remote from the observer in Fig. 32, a rod or large pin 204 (see Fig. 42) has one end screw-threaded and rigidly secured to the reinforced lower portion of the lever 202. The rod 204 extends horizontally and its right-hand end is reduced in diameter to carry a block or fulcrum 205 (see Figs. 33 and 34), on opposite sides of which a pair of relatively short links 206 (see Figs. 37 and 38) extend at right angles to the axis of the rod 204 towards the corresponding interlocking arm member 171.

The other ends of the links 206 are mounted upon a corresponding block 207 (see Figs. 39 and 40) which is located in direct alinement with the outer end of the arm 171. A bolt 208 (see Fig. 41), which extends through the coil spring 174 and is used for adjusting purposes, passes beyond the arm 171 and engages a screw-threaded hole on the block 207. The outer free end of the L-shaped lever 202 is bent at right angles to the main plane of the lever to constitute a striking arm 202$^a$, which may be engaged by the corresponding interlock arm 98$^a$.

Consequently, the switch 11 is interlocked with the cam tip 51 of the switch 10 through the interlock arm 98a, the L-shaped lever 202, the rod 204, links 206, and bolt 208.

A similar mechanical arrangement is provided between the switch 10 and the cam tip 51a corresponding to the switch 11. In this instance the S-shaped lever 201 is rigidly secured to the screw-threaded end of a rod 209 corresponding to the previously described rod 204, the outer and reduced-diameter end of which passes through a block or fulcrum 210, on opposite sides of which a plurality of links 211 (see Figs. 35 and 36), which are necessarily longer than the previously-described links 206, extend towards the correspondingly interlocking mechanism 158a. In this case the links 211 are secured to a block 212 which is mounted upon the end of the adjusting bolt 208a. The outer or free end 213 of the lever 201 is adapted to be struck by the interlock arm 98.

It will be seen, therefore, that each of the illustrated switches is mechanically interlocked with the other by means of two sets of intercrossing members severally extending in three planes substantially at right angles the one to the other. The concurrent closure of the switches is absolutely precluded, as will be evident from the following discussion.

The operation of the interlocking apparatus just described may be set forth as follows. Assuming that the switch 11 is closed in the ordinary sequence of operation, the knob insulator 97 and the interlock arm 98 are actuated towards the right, as indicated by the arrow in Fig. 32, into the closed position of the switch 11. In that event the arm 202a of the L-shaped lever 202 is struck by the interlock arm 98a. The lever 202, consequently, pivots around the lower mounting pin 203, and by means of the links 206, which are connected to the lever 202, and the mechanically associated parts, exerts pressure upon the abutting end of the interlocking arm 171 and compresses the spring 174, as will be evident from a perusal of the corresponding dotted line position of the L-shaped lever 202.

Consequently, if it is attempted to close the parallel-connecting switch 10 by means of the cam 52 while the series-connecting switch 11 is still closed, the cam tip arm 172 merely rotates about the pivotal point 173 and further compresses the helical spring 174. By reason of the pressure exerted upon the outer end of the arm 171 by the block 207, the arm 171 is not permitted to move towards the left to engage and press the armature pin 170 that is shown in Fig. 22. However, as soon as the series-connecting switch 11 has opened, the operation of the cam 52 will be effective to close the parallel-connecting switch 10, since in that event the pressure of the coil spring 174 is sufficient to return the L-shaped lever 202 to its normal or solid-line position, inasmuch as the interlock arm 98a no longer prevents such return movement.

A corresponding operation to prevent the closure of the switch 11 before the opening of the switch 10 during the backward movement of the cam shaft 175 will also occur, as will be understood without further description, by reason of its analogy to the interlocking just described.

It will be seen that by my invention I provide a much more simple, convenient, and flexible submarine control than has previously been provided and, by means of the illustrated circuit connections and mechanisms, I am enabled to equalize the load upon a plurality of compound-wound motors, and also to utilize either electrical or purely manual control of the motors, suitable preventive interlocking being provided in both cases.

However, it will be evident that various modifications of the circuit arrangements and structural parts may be effected without departing from the spirit and scope of my invention. I desire, therefore, that only such limitations shall be imposed as are indicated in the appended claims.

I claim as my invention:

1. In a control system, the combination with a plurality of electric motors severally having armatures and shunt field windings of single means for effecting motor acceleration by successive armature-circuit and field-circuit manipulation, and means selectively coacting with said single means for effecting either series or parallel relation of said motors during the period of said armature-circuit manipulation.

2. In a control system, the combination with a plurality of electric motors severally having armatures and shunt field windings of single means for effecting motor acceleration by successive reduction of armature-circuit resistance and increase of field-circuit resistance, and means selectively interlocking with said single means for effecting either series or parallel connection of said motors during the period of armature-circuit-resistance reduction.

3. In a control system, the combination with a plurality of dynamo-electric machines severally having armatures and field windings, of a controlling device for governing the reversal, starting and field-circuit regulation of said machines, and means co-operating with said device for selectively effecting series or parallel relation of said machines.

4. In a control system, the combination with a plurality of electric motors severally having armatures and shunt-field windings, of a single controlling device for governing the reversal starting and field-circuit regulation of said motors, and means selectively co-acting with said device for effecting either series or parallel relation of said motors during the starting period.

5. In a control system, the combination with a plurality of electric motors severally having armatures and shunt-field windings, of a master controller comprising a single drum for reversal armature-circuit-resistance control and field-circuit regulation of said motors, and another drum selectively interlocking with said single drum for effecting either series or parallel connection of said motors during the period of armature-circuit-resistance control.

6. In a control system, the combination with a plurality of motors, of means for independently governing the starting operations of said motors, and means for governing a different operation thereof and for preventing said starting operations at times.

7. In a control system, the combination with a plurality of sets of motors, of means for independently governing the starting operations of said sets of motors, and means for selectively effecting series-parallel control of said sets and for preventing operation thereof.

8. In a control system, the combination with a plurality of sets of motors severally having armatures and field windings, of independent means for effecting successive armature-circuit and field-circuit regulation of said sets of motors, and means for selectively co-acting with said independent means to effect series-parallel control of the sets of motors or to prevent the operation thereof.

9. In a control system, the combination with a plurality of sets of motors severally having armatures and shunt field windings, of independent controlling devices for successively effecting armature-circuit-resistance reduction and field-circuit-resistance increase, and a drum selectively interlocking with said devices to effect series or parallel relation of said motors or to prevent certain movements of said devices.

10. In a control system, the combination with a plurality of sets of motors severally having armatures and shunt field windings, of a master controller comprising a plurality of drums for effecting reversal armature-circuit-resistance control and field-circuit regulation of the respective sets of said motors, and another drum selectively interlocking with said plurality of drums to effect series or parallel connection of the sets of motors or to lock said drums in certain positions.

11. The combination with a plurality of dynamo-electric machines, severally having shunt field windings, of a plurality of resistors in circuit with the individual field windings and another resistor in a common circuit therewith, means for initially adjusting the relative values of the individual resistors to compensate for differences in said machines, and means for subsequently varying said other resistor to maintain subsequently equal loads upon said machines.

12. The combination with a plurality of dynamo-electric machines severally having shunt field windings, of a plurality of resistors in circuit with the individual field windings, a plurality of parallel-related resistors connected in a common circuit with said field windings, means for initially adjusting the relative values of the individual resistors to compensate for differences in said machines, and means for subsequently varying the remaining resistors equally and simultaneously.

13. The combination with a plurality of dynamo-electric machines severally having shunt field windings, of a plurality of resistors, and means for connecting corresponding terminals thereof for common equalized operation in the field-winding circuit when the several machines are active and for connecting one of said resistors in circuit when only one machine is active.

14. The combination with a plurality of dynamo-electric machines severally having shunt field windings, of a plurality of resistors, and means for connecting said resistors in parallel relation in the field-winding circuit when the machines are all active and for connecting only one of said resistors in circuit concurrently with the exclusion of one shunt field winding and the corresponding motor from circuit.

15. The method of equalizing the load upon a plurality of dynamo-electric machines that consists in initially adjusting the excitation circuit of one machine relative to another and subsequently varying the several excitation circuits equally and simultaneously.

16. The method of equalizing the load upon a plurality of motors having shunt field windings that consists in initially adjusting the relative resistance values of the field winding circuits to compensate for differences in the machines and subsequently varying such values equally and simultaneously.

17. A controller comprising a plurality of speed drums arranged one above the other, oppositely-located manual operating means for the respective drums, a single series-parallel drum and a plurality of cut-out drums having their axes substantially at right angles to those of the other drums.

18. A controller comprising an upper and a lower compartment, a plurality of speed drums arranged one above the other in said lower compartment, oppositely-located manual operating means for the respective drums positioned above the lower compartment, and a single series-parallel drum and a plurality of cut-out drums located in said upper compartment, the axes of said cut-out drums extending substantially at right angles to those of the other drums.

19. A controller comprising a control handle, a motor-governing switching device, and means for permitting the operation of said handle only when said device occupies an operative position and for permitting the operation of said device only when said handle occupies an inoperative or certain operative positions.

20. A controller comprising a speed-control handle, a series-parallel drum, and means for permitting the operation of said handle only when said drum occupies its "Series" or its "Parallel" position and for permitting the operation of said drum only when said handle occupies an inoperative position or an operative position corresponding to said "Series" position.

21. A controller comprising a control handle, a motor governing switching device, and means for preventing operation of said handle unless said device occupies an operative position and for preventing operation of said device unless said handle occupies an inoperative or certain operative positions.

22. A controller comprising a speed-control handle, a series parallel drum, and means for preventing operation of said handle unless said drum occupies its "Series" or its "Parallel" position and for preventing operation of said drum unless said handle occupies an inoperative position or an operative position corresponding to said "Series" position.

23. A controller comprising a control handle having notches corresponding to certain operative and inoperative positions, a controller drum having correspondingly located notches of different depths, and an interlocking member disposed to enter said notches, whereby relative movement of said handle and said drum are prevented in certain relative positions.

24. A controller comprising a speed-control handle having notches respectively corresponding to "Off," "Series forward" and "Series reverse" positions, a series-parallel drum having correspondingly located notches corresponding to "Off," "Series" and "Parallel" positions, the notches corresponding to the two operative positions being deeper than the other notch, and an interlocking pin biased to engage said drum notches.

25. A controller comprising a control handle, a control drum, an interlocking device, means for normally locking said handle with said device, and means supported by said device for mutually interlocking said handle and said drum.

26. A controller comprising a control handle, a control drum, an interlocking device, a spring-pressed latch in said handle for normally engaging a locking recess in said device, and a pin carried by said device for preventing certain relative movements of said handle and said drum.

27. A controller comprising a control handle, a control drum, an interlocking device, a spring-pressed latch in said handle for normally engaging a locking recess between two ledges on said device, and a biased pin extending through said device for preventing certain relative movements of said handle and said drum.

28. A controller comprising a control handle, a control drum, an interlocking device, means for normally locking said handle with said device, means supported by said device for mutually interlocking said handle and said drum, and actuating means for said drum adapted to be operatively inserted through said device only when said drum occupies a certain position.

29. A controller comprising a control handle, a control drum, an interlocking device, a spring-pressed latch in said handle for normally engaging a locking recess in said device, a pin carried by said device for preventing certain relative movements of said handle and said drum, and an actuating key for said drum adapted to be operatively inserted through said device only when said drum occupies a certain position.

30. A controller comprising a control handle, a control drum, an interlocking device, a spring-pressed latch in said handle for normally engaging a locking recess between two ledges on said device, a biased pin extending through said device for preventing certain relative movements of said handle and said drum, and an actuating key for said drum having a boss adapted to be operatively inserted through a notch in said device only when said drum occupies a certain position.

31. The combination with a machine governing movable contact member, of power means and manual means for selectively operating said member, and means rendered active in the event of certain operating conditions of said machine for mutually interlocking said operating means.

32. The combination with a movable contact member, of electrical control and manual control for said member, and means for concurrently rendering said electrical control inoperative and permitting the use of said manual control.

33. The combination with a machine governing movable contact member, of power means and manual means for selectively operating said member, and means for concurrently rendering said power means inoperative and permitting the use of said manual means.

34. The combination with a machine-governing movable contact member, of remote and direct control for said member, and means active in the event of certain operating conditions of said machine for preventing concurrent operation of both controls.

35. The combination with a machine governing movable contact member, of power means and manual means for selectively operating said member, a switch for governing certain machine-influencing circuits, and means responsive to the position of said switch for permitting the use of only one of said operating means at a time.

36. The combination with a machine governing movable contact member, of power means and manual means for selectively operating said member, of means for normally locking said manual means in a certain position, and means rendered active in the event of predetermined operating conditions of said machine for removing said lock.

37. The combination with a machine governing movable contact member, of power means and manual means for selectively operating said member, of means for normally locking said manual means in an inoperative position, and means for concurrently rendering said power means inoperative and removing said lock.

38. The combination with a movable contact member, of electrical control and manual control for said member, means for normally preventing the use of said manual control, and means for concurrently rendering said electrical control and said preventing means inoperative.

39. The combination with a machine governing movable contact member, of power means and manual means for selectively operating said member, of means for normally rendering one of said means inoperative, and means active in the event of certain operating conditions of said machine for removing the effect of the first-named means.

40. The combination with a movable contact member, of electrical control and manual control for said member, means for normally preventing the use of one of said controls and means for concurrently rendering the other control and said preventing means inoperative.

41. The combination with a machine governing movable contact member, of remote and direct control for said member, means for normally rendering one of said controls inoperative, and means co-operating with the first-named means for preventing concurrent use of both controls.

42. The combination with a machine governing movable contact member, of power-means and manual means for selectively operating said member, a switch having two positions respectively corresponding to said means, and means co-operating with said switch for preventing concurrent operation of said power and said manual means.

43. The combination with a machine governing movable contact member, of power means and manual means for selectively operating said member, a switch having two positions respectively corresponding to said means, and means for normally locking one of said operating means in a certain position and governed by said switch for removing said lock.

44. The combination with a machine governing movable contact member, of power means and manual means for selectively operating said member, a switch having two positions respectively corresponding to said means, a lever normally biased to lock one of said operating means in an inoperative position and governed by said switch for removing said lock.

45. The combination with a machine governing movable contact member, of power means and manual means for selectively operating said member, a switch having two positions respectively corresponding to said means, and a lever normally biased to lock said manual means in an inoperative position and actuated by said switch for removing said lock.

46. The combination with a movable contact member, of a manually operable shaft for effecting movement of said member, means for normally locking said shaft in a certain position, means for effecting electrical control of said movement, and a switch for rendering said electrical control inoperative and removing said locking means.

47. The combination with a movable contact member, of a manually operable shaft for effecting movement of said member, a lever biased to lock said shaft in an inoperative position, a controller for electrically effecting said movement, and a switch for open-circuiting said electrical control and actuating said lever to overcome the biasing effect.

48. The combination with a movable contact member and power means for actuating said member, of a manually operable cam shaft for rendering said power means operative, a lever biased to lock said shaft in an inoperative position, a controller for electrically rendering said power means operative, and a switch for open-circuiting said controller and depressing said lever to remove the lock upon said shaft.

49. The combination with a movable contact member, pneumatic means for actuating said member and a valve for controlling said pneumatic means, of a manually operable cam shaft for actuating said valve, a lever biased to lock said shaft in an inoperative position, a controller for electrically controlling said valve, and a switch for open-circuiting said controller and depressing said lever to remove the lock upon said shaft.

50. The combination with a movable contact member, pneumatic means for actuating said member and a valve for controlling said pneumatic means, of a manually operable cam shaft, means for resiliently connecting said shaft and said valve, a lever biased to lock said shaft in an inoperative position, a controller for electrically controlling said valve, and a switch for open-circuiting said controller and depressing said lever to remove the lock upon said shaft.

51. The combination with a dynamo-eletric machine having an armature and a field winding, of a movable contact member for governing certain connections of said machine, power means and manual means for selectively operating said member, and means active in the event of certain changes in the conditions of said field winding for mutually interlocking said operating means.

52. The combination with a dynamo-electric machine having an armature and a field winding, of a movable contact member for governing certain connections of said machine, remote and direct control for said member, and means active in the event of certain changes in the conditions of said field winding for preventing concurrent operation of both controls.

53. The combination with a dynamo-electric machine having an armature and a field winding, of a movable contact member for governing certain connections of said machine, power means and manual means for selectively operating said member, a switch for governing the connections of said field winding, and means responsive to the position of said switch for permitting the use of only one of said operating means at a time.

54. The combination with a dynamo-electric machine having an armature and a field winding, of a movable contact member for governing certain connections of said machine, means for normally locking said manual means in a certain position, and means active in the event of a certain change in the circuit of said field winding for removing said lock.

55. The combination with a dynamo-electric machine having an armature and a field winding, of a movable contact member for governing certain connections of said machine, means for normally rendering one of said means inoperative, and means active in the event of certain changes in the conditions of said field winding for removing the effect of the first-named means.

56. The combination with a dynamo-electric machine having an armature and a field winding, of a movable contact member for governing certain connections of said machine, power means and manual means for selectively operating said member, a switch having two positions respectively corresponding to different conditions of said field winding and also corresponding to said means, and means co-operating with said switch for preventing concurrent use of said power and said manual means.

57. The combination with a dynamo-electric machine having an armature and a field winding, of a movable contact member for governing certain connections of said machine, a switch having two positions respectively corresponding to different conditions of said field winding and also corresponding to said means, and means for normally locking one of said operating means in a certain position and governed by said switch for removing said lock.

58. The combination with a dynamo-electric machine having an armature and a field winding, of a movable contact member for governing certain connections of said machine, a switch having two positions respectively corresponding to different conditions of said field winding and also corresponding to said means, and a lever normally biased to lock said manual operating means in an inoperative position and actuated by said switch for removing said lock.

59. The combination with a dynamo-electric machine having an armature and a field winding, of a movable contact member for governing certain of the machine circuits, a manually operable shaft for effecting movement of said member, means for normally locking said shaft in a certain position, means for effecting electrical control of said movement, and a switch for rendering said electrical control inoperative, removing said lock and changing the connections of said field winding.

60. The combination with a dynamo-electric machine having an armature and a field winding, of a movable contact member for governing certain of the machine circuits, a manually operable shaft for effecting movement of said member, a lever biased to lock said shaft in an inoperative position, a controller for electrically effecting said movement, and a switch for open-circuiting said electrical control, changing the connections of said field winding and actuating said lever to overcome the biasing effect.

61. The combination with a dynamo-electric machine having an armature and a shunt field winding, of a movable contact member for governing certain of the machine circuits, power-means for actuating said member, a manually operable cam shaft for rendering said power-means operative, a lever biased to lock said shaft in an inoperative position, a controller for electrically rendering said power-means operative and for varying the excitation of said field winding, and a switch for open-circuiting said controller, changing the field winding connections to maximum-excitation condition and depressing said lever to remove the lock upon said shaft.

62. The combination with a dynamo-electric machine having an armature and a field winding, of a movable contact member for governing certain of the machine circuits, manual means for governing the operation of said member, power means including a controller for electrically effecting the operation of said member and for varying the excitation of said field winding, means for normally locking said manual means in an inoperative position, and a switch for open-circuiting said power means, changing the field winding connections to provide a predetermined degree of excitation, and mechanically removing said lock.

63. The combination with a plurality of switches, of means for effecting the selective closure thereof and means for preventing the concurrent closure thereof, said preventing means comprising a plurality of sets of intercrossing elements extending between corresponding parts of different switches.

64. The combination with a plurality of switches, of means for effecting the selective closure thereof and means for preventing the concurrent closure thereof, said preventing means comprising a plurality of pivotally mounted intercrossing members adapted to be engaged by the respective closing switches for rendering the selective closing means corresponding to another switch inoperative.

65. The combination with movable members of two switches and actuating members therefor, of mechanical interlocking means between said switches and said actuating members comprising two sets of intercrossing members severally extending in three transversely-related planes.

66. The combination with movable members of two switches and actuating members therefor, of mechanical interlocking means between said switches and said actuating members comprising two sets of intercrossing members severally extending in three planes substantially at right angles the one to the other.

67. The combination with a movable contact-operating member of one switch and an actuating member of a second switch, of mechanical interlocking means between said members comprising a set of elements extending in three transversely-related planes.

68. The combination with a movable contact-operating member of one switch and an actuating member of a second switch, of mechanical interlocking means between said members comprising a set of elements extending in three planes substantially at right angles the one to the other.

69. The combination with a plurality of switches, of means for effecting the selective closure thereof and means for preventing the concurrent closure thereof, said preventing means comprising a pivotally mounted member having a bent portion extending in one direction to be engaged by a closing switch, a rod secured to said member and extending in the opposite direction, and means for connecting said rod to the closing means corresponding to another switch.

70. The combination with a plurality of switches, of means for effecting the selective closure thereof and means for preventing the concurrent closure thereof, said preventing means comprising a plurality of members mounted on a common axis and severally having bent portions extending in opposite directions to be engaged by the respective closing switches, a plurality of rods secured to the respective members, located side-by-side and extending in opposite directions to the corresponding bent portions, and a plurality of links for connecting the free ends of said rods to the closing means corresponding to another switch.

71. The combination with a plurality of switches, of oscillatable means for effecting the selective closure thereof, and means for preventing the concurrent closure thereof, said preventing means comprising a plurality of pivotally mounted levers adapted to be engaged by the respective closing switches and provided with intercrossing rods extending at substantially right angles and pivotally secured to the oscillatable means corresponding to another switch.

72. The combination with a plurality of switches, severally having movable primary controlling members, of means comprising a plurality of resiliently associated arms for actuating said members.

73. The combination with a plurality of switches, of pneumatic means for operating said switches, a plurality of valve pins for governing said means, and means comprising a plurality of resiliently connected arms for actuating said pins.

74. The combination with a plurality of switches, of pneumatic means for operating said switches, a plurality of valve pins for governing said means, a plurality of rotatable cams, and means comprising a plurality of sets of resiliently connected arms interposed between the respective cams and pins.

75. The combination with a plurality of movable switch members severally having movable primary controlling members, of means comprising a plurality of sets of resiliently associated arms for actuating said members, and means for preventing the concurrent closure of said switches, said preventing means comprising a plurality of sets of intercrossing elements extending between each switch member and one of the resiliently associated arms corresponding to another switch.

76. The combination with a plurality of movable switch members severally having movable primary controlling members, of means comprising a plurality of sets of resiliently associated arms for actuating said members, and means for preventing the concurrent closure of said switches, said preventing means comprising a pivotally mounted member adapted to be engaged by a closing switch for operating one of the resiliently associated arms corresponding to another switch.

77. The combination with a plurality of switches, of pneumatic means for operating said switches, a plurality of valve pins for governing said means, means comprising a plurality of resiliently connected arms for actuating said pins, and means for preventing the concurrent closure of said switches, said preventing means comprising a plurality of pivotally mounted intercrossing members adapted to be engaged by the respective closing switches for operating one of the resiliently connected arms corresponding to another switch.

78. The combination with a plurality of movable switch members severally having movable primary controlling members, of means comprising a plurality of sets of resiliently associated arms for actuating said members, and means for preventing the concurrent closure of said switches, said preventing means comprising a pivotally mounted lever adapted to be engaged by the corresponding closing switch and provided with a rod extending at substantially right angles and pivotally secured to one of the resiliently associated arms corresponding to another switch.

79. The combination with a plurality of switches, of pneumatic means for operating said switches, a plurality of valve pins for governing said means, means comprising a plurality of resiliently connected arms for actuating said pins, and means for preventing the concurrent closure of said switches, said preventing means comprising a plurality of pivotally mounted levers adapted to be engaged by the respective closing switches and severally provided with intercrossing rods extending at substantially right angles and pivotally secured to one of the resiliently connected arms corresponding to another switch.

80. The combination with a plurality of movable switch members severally having movable primary controlling members, of means comprising a plurality of sets of resiliently associated arms for actuating said members, and means for preventing the concurrent closure of said switches, said preventing means comprising a pivotally mounted member having a bent portion extending in one direction to be engaged by a closing switch, a rod secured to said member and extending in the opposite direction, and means for connecting said rod to one of the resiliently associated arms corresponding to another switch.

81. The combination with a plurality of switches, of pneumatic means for operating said switches, a plurality of valve pins for governing said means, means comprising a plurality of resiliently connected arms for actuating said pins, and means for preventing the concurrent closure of said switches, said preventing means comprising a plurality of members mounted on a common axis and severally having bent portions extending in opposite directions to be engaged by the respective closing switches, a plurality of rods secured to the respective members, located side-by-side and extending in opposite directions to the corresponding bent portions, and a plurality of links for connecting the free ends of said rods to corresponding resiliently-operating arms for the respective switches.

82. The combination with a plurality of switches, of electrical means and manual means for governing said switches, means for electrically preventing the concurrent closure of said switches during the electrical control periods, and means for mechanically preventing such concurrent closure during manual control periods.

83. The combination with a plurality of switches, of electrical means and manual means for governing said switches, means comprising a plurality of contact members on each switch for controlling the other switch and preventing concurrent closure of the switches during electrical control periods, and means comprising a plurality of sets of intercrossing elements extending between corresponding parts of different switches for preventing such concurrent closure during manual control periods.

84. The combination with a plurality of switches, of electrical means and manual means for governing said switches, means comprising a plurality of contact members on each switch for controlling the other switch and preventing concurrent closure of the switches during electrical control periods, means for effecting the selective and means for preventing the concurrent closure of said switches during manual control periods, said last-named preventing means comprising a plurality of pivotally mounted intercrossing members adapted to be engaged by the respective closing switches for rendering the selective closing means corresponding to another switch inoperative.

85. The combination with a plurality of switches severally having movable primary controlling members, of a cam shaft, and means comprising a plurality of resiliently associated arms interposed between said primary members and said cam shaft.

86. The combination with a plurality of switches severally having primary controlling members, of a shaft provided with a plurality of cams, and means comprising a plurality of resiliently connected arms respectively adapted to engage one of said cams and one of said primary members.

87. The combination with a plurality of switches, of pneumatic means for operating said switches, a plurality of valve pins for governing said means, a shaft provided with a plurality of cams, and means comprising a plurality of resiliently connected arms respectively adapted to engage one of said cams and one of said pins.

88. The combination with a plurality of switches severally having movable primary controlling members, of a cam shaft, means comprising a plurality of resiliently associated arms interposed between said primary members and said shaft, and means actuated by one switch for preventing the operation of one of the arms corresponding to another switch.

89. The combination with a plurality of switches severally having movable primary controlling members, of a shaft provided with a plurality of cams, means comprising a plurality of resiliently-connected arms respectively adapted to engage one of said cams and one of said primary members, and means for preventing concurrent closure of said switches comprising a plurality of sets of intercrossing elements each extending between a certain part of one switch and the arm of another switch that engages the corresponding controlling member.

90. The combination with a plurality of switches, of pneumatic means for operating said switches, a plurality of valve pins for governing said means, a shaft provided with a plurality of cams, means comprising a plurality of resiliently connected arms respectively adapted to engage one of said cams and one of said pins, and means for preventing the concurrent closure of said switches comprising a plurality of pivotally mounted intercrossing members adapted to be engaged by the respective closing switches for rendering the pin-engaging arm of another switch inoperative.

91. The combination with a plurality of switches severally having movable primary controlling members, of a cam shaft, means comprising a plurality of resiliently associated arms interposed between said primary members and said shaft for effecting manual control of said switches, electrical means for alternately governing said switches, means for electrically preventing the concurrent closure of said switches during electrical control periods, and mechanical means actuated by one switch for preventing the operation of one of the arms corresponding to another switch, whereby such concurrent closure is also prevented during manual control periods.

92. The combination with a plurality of switches, of pneumatic means for operating said switches, a plurality of valve pins for governing said means, a shaft provided with a plurality of cams, means comprising a plurality of resiliently connected arms respectively adapted to engage one of said cams and one of said pins for effecting manual control of said switches, means comprising a plurality of contact members on each switch for controlling the other switch and preventing concurrent closure of said switches during electrical control periods, and means for preventing the concurrent closure of said switches during manual control periods comprising a plurality of pivotally mounted intercrossing members adapted to be engaged by the respective closing switches for rendering the pin-engaging arms of said other switches inoperative.

In testimony whereof, I have hereunto subscribed my name this 17th day of November 1920.

LYNN G. RILEY.